United States Patent
Trika

(10) Patent No.: US 10,606,488 B2
(45) Date of Patent: Mar. 31, 2020

(54) SELECTIVE DATA FLUSH IN A STORAGE DEVICE

(71) Applicant: INTEL CORPORATION, Santa Clara, CA (US)

(72) Inventor: Sanjeev N. Trika, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/640,169

(22) Filed: Jun. 30, 2017

(65) Prior Publication Data

US 2019/0004715 A1    Jan. 3, 2019

(51) Int. Cl.
  *G06F 3/00*  (2006.01)
  *G06F 3/06*  (2006.01)
  *G06F 12/121*  (2016.01)
  *G06F 12/02*  (2006.01)

(52) U.S. Cl.
  CPC ......... *G06F 3/0619* (2013.01); *G06F 3/065* (2013.01); *G06F 3/0652* (2013.01); *G06F 3/0659* (2013.01); *G06F 3/0679* (2013.01); *G06F 12/0246* (2013.01); *G06F 12/121* (2013.01); *G06F 3/0623* (2013.01); *G06F 2212/7203* (2013.01)

(58) Field of Classification Search
None
See application file for complete search history.

(56) References Cited

U.S. PATENT DOCUMENTS

| | | | | |
|---|---|---|---|---|
| 7,716,673 | B2 * | 5/2010 | Chauvel | G06F 9/30174 711/202 |
| 9,753,868 | B2 * | 9/2017 | Yamada | G06F 12/1416 |
| 2017/0185354 | A1 | 6/2017 | Doshi et al. | |

OTHER PUBLICATIONS

Yeon, J., et al., "RFLUSH: Rethink the Flush", In the Proceedings of the 16th USENIX Conference on File and Storage Technologies, Feb. 2018, 10 pp.
NVM Express, "NVM Express Explained", [online], Apr. 2013, [Retrieved on Jun. 18, 2017], Retrieved from the Internet at <URL: http://www.nvmexpress.org/wp-content/uploads/2013/04/NVM_whitepaper.pdf>, 5 pp.
T.S. Pillai, et al., "Application Crash Consistency and Performance with CCFS", In Proceedings of the 15th USENIX conference on File and Storage, Feb.-Mar. 2017, 16 pp.
Wikipedia, "Flash Memory Controller", [online], [Retrieved on Jun. 16, 2017], Retrieved from the Internet at <URL: https://en.wikipedia.org/wiki/Flash_memory_controller>, 3 pp.

* cited by examiner

*Primary Examiner* — Midys Rojas
(74) *Attorney, Agent, or Firm* — Konrad Raynes Davda & Victor LLP

(57) ABSTRACT

In one embodiment, a storage drive is configured to receive a selective flush command which causes the storage drive to selectively flush write data which has been identified in connection with the selective flush command, from volatile buffer memory to a nonvolatile storage memory. Conversely, write data stored in the volatile buffer memory which is not identified in connection with the selective flush command, may remain unaffected by the selective flush command, and thus may remain stored in the volatile buffer memory without being flushed to the nonvolatile storage memory as a result of the selective flush command. Other aspects are described herein.

22 Claims, 5 Drawing Sheets

| TRANSACTION MAPPING TABLE 120 ||
|---|---|
| BUFFER LOCATIONS 120a | TRANSACTION ID 120b |
| BLS1 | T_ID1 |
|  |  |
|  |  |

| STREAM MAPPING TABLE 130 ||
|---|---|
| BUFFER LOCATIONS 130a | STREAM ID 130b |
| BLS2 | S_ID2 |
|  |  |
|  |  |

| QUEUE PAIR MAPPING TABLE 140 ||
|---|---|
| BUFFER LOCATIONS 140a | QUEUE PAIR ID 140b |
| BLS3 | QP_ID3 |
|  |  |
|  |  |

SELECTIVE DATA FLUSH IN A STORAGE DEVICE

TECHNICAL FIELD

Certain embodiments of the present invention relate generally to storage drives having a volatile buffer memory and a non-volatile storage memory.

BACKGROUND

A storage drive typically has nonvolatile storage memory which retains data stored in the nonvolatile storage memory notwithstanding a power loss to the storage drive. However, to increase system performance, storage drives frequently also employ a relatively fast volatile buffer memory in which write data to the storage drive is initially stored before it is subsequently transferred to the nonvolatile storage memory. Thus the storage drive may report to the host that a write request (also referred to as a write operation) has been completed notwithstanding that the "completed-to-host" write data has only been written to a volatile buffer memory of the storage drive. Since completed-to-host write data which has stored only in the volatile buffer memory may be lost in the event power to the storage device is interrupted, storage drives employing volatile buffer memory often have a "flush" capability in which applications can issue a flush command to the storage drive to cause any write data not yet transferred to the nonvolatile storage memory, to be flushed, that is transferred to the nonvolatile storage memory to ensure that the data is safely stored in nonvolatile storage memory.

New data stored in the volatile buffer memory is often referred to as "dirty" data if the new data has not yet been transferred to the nonvolatile storage memory at the appropriate address. Similarly new data stored in the volatile buffer memory is "dirty" data if it is an updated version of an earlier version which has been transferred to the nonvolatile storage memory.

BRIEF DESCRIPTION OF THE DRAWINGS

Embodiments of the present disclosure are illustrated by way of example, and not by way of limitation, in the figures of the accompanying drawings in which like reference numerals refer to similar elements.

FIGS. 5A, 5B, 5C each show an example of a data structure mapping buffer locations storing data to an identification associated with a set of write requests which caused data to be stored in the associated buffer locations.

DESCRIPTION OF EMBODIMENTS

Figure 1:
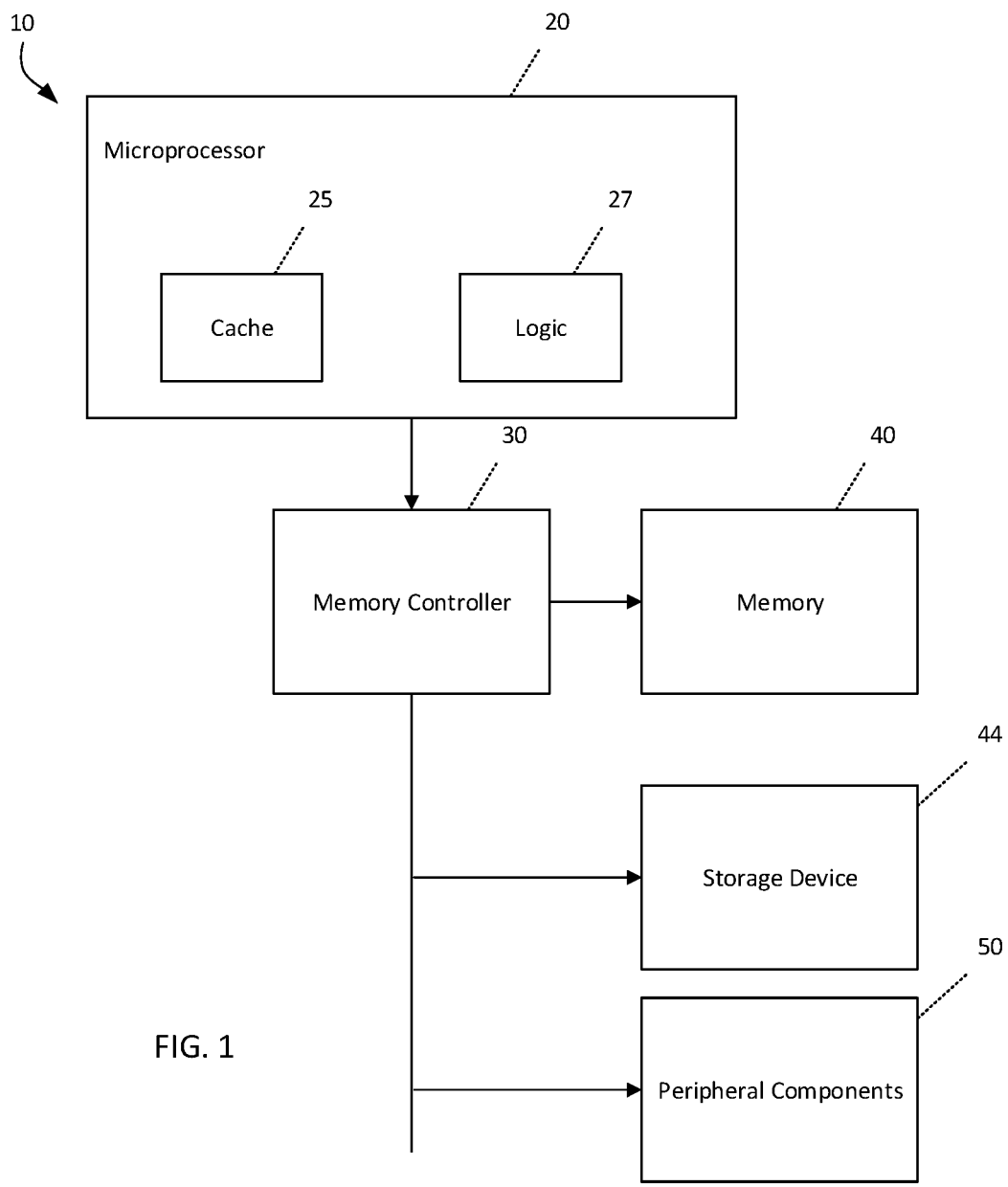
FIG. 1 depicts a high-level block diagram illustrating selected aspects of a system employing a storage drive having selective data flush in accordance with an embodiment of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

One approach for a storage drive flush command is to operate in a global fashion to flush all dirty data both entirely new and updated data from the volatile buffer memory to the nonvolatile storage memory. Thus, a flush completion causes all previously completed writes to be stored in nonvolatile storage memory. Unmodified data previously stored at the appropriate address in the nonvolatile storage memory is frequently referred to as "clean" data and need not be flushed to the nonvolatile storage memory since a copy of the data already exists in the nonvolatile storage memory at the appropriate address.

Another approach is to set a forced-unit-access (FUA) bit for a particular write request to force the storage device to store the write data of the write request in nonvolatile storage memory before the write request is reported to the host as completed. Yet another approach is for the operating system (OS) to obviate flush commands and FUA bit setting altogether by disabling all caching of write data in a volatile buffer memory of the storage drive. As a result, all write requests directed to the storage drive automatically cause the write data to be stored in nonvolatile storage memory before the write requests are reported as complete, without the need for flush commands or FUA bit setting.

Storage drives may also utilize capacitors to store power which may be utilized in the event of external power loss to the storage drive. As a result, additional time may be provided to flush dirty data from the volatile buffer memory to the nonvolatile storage memory until the storage capacitors are discharged.

It has been proposed for an application to organize write requests into various streams. It is said that such an application can issue to the operating system, flush commands on a per stream basis, processed with central processing unit (CPU) overhead by the OS software.

It is appreciated herein that previously known flush commands can incur a substantial penalty on performance. For example, prior flush commands which operate on a global basis cause all dirty data, that is all previously completed-to-host writes, both dependent write requests associated with a particular application which issued the flush command, and independent write requests unassociated with the particular application, to be flushed to the nonvolatile storage memory of the storage drive. However, it is further appreciated herein that such global flush operations can be significantly wasteful of system resources since not all dirty data needs be flushed in many applications. On the contrary, it is recognized that the write data of write requests unrelated to an application which issued a flush command need not be flushed to nonvolatile storage memory. In addition to wasting system resources, such unneeded flushing of write data can significantly increase write latency, causing a processor to wait longer for the flush operations to complete.

In one aspect of the present description, a device such as a storage drive or memory, for example, is configured to receive a selective flush command which causes the device drive to selectively flush only the write data which has been identified in connection with the selective flush command, from the volatile buffer memory to the nonvolatile storage memory. In one embodiment, the selective flush command may be passed to the device by a device driver such as a storage driver, for example.

Conversely, write data stored in the volatile buffer memory which is not identified in connection with the selective flush command, remains unaffected by the selective flush command, and thus remains stored in the volatile buffer memory without being flushed to the nonvolatile storage memory as a result of the selective flush command. Thus, in one embodiment, only write data which needs to be flushed, such as write data of write requests related to the thread or process or application that issued the selective flush command, is processed by the selective flush command by being flushed to the nonvolatile storage memory. As a consequence, system performance may be significantly enhanced.

Write data may be identified for selective flushing in accordance with the present description using a variety of selection criteria. For example, write data pertaining to a particular write data source such as a host, application, thread, process, write transaction, write stream, or submission and completion queue pair may be identified for selective flushing to nonvolatile storage memory in connection with a selective flush command. Thus write data not pertaining to the particular write data source may remain unaffected by the selective flush command. It is appreciated that write data may be identified for selective flushing in accordance with the present description using other selection criteria, depending upon the particular application.

As noted above, flush commands previously were obviated in some applications by setting a forced-unit-access (FUA) bit for a particular write request to force the storage device to store the write data of the write request in nonvolatile storage memory before the write request is reported to the host as completed. However, it is appreciated herein that each write request for which a forced-unit-access (FUA) bit is set can cause significant write latency since each such individual write request is forced to wait for completion of the particular individual write to nonvolatile, often slower memory.

In contrast, in a storage drive employing selective flush command processing in accordance with the present description, a selective flash command may be utilized to flush the write data of an entire selected set of write requests to the nonvolatile storage memory. Thus, waiting for write requests to complete to nonvolatile storage memory, on a write request by write request basis, can be reduced or eliminated, thereby improving system performance.

A set of write requests may be identified for selective flushing to nonvolatile storage memory in accordance with the present description using a variety of selection criteria. For example, a write transaction having a set of write request, a write stream having a set of write requests or a submission and completion queue pair having a set of write requests, may be identified for selective flushing to nonvolatile storage memory. It is appreciated that other selection criteria for selecting a set of write requests for selective flushing in accordance with the present description may be employed, depending upon the particular application.

It is further appreciated that disabling buffering write requests to volatile buffer memory can incur a significant increase in write latency on all write requests forced to complete directly to a slow nonvolatile storage memory. In contrast, in a storage drive employing selective flush command processing in accordance with the present description, write requests may continue to be buffered by writing to generally faster volatile memory. As a result, performance may be significantly improved as compared to previous techniques utilizing buffer disablement.

As noted above, storage drives may also utilize capacitors to store power which may be utilized in the event of external power loss to the storage drive. However, it is appreciated herein that such storage capacitors can occupy a substantial amount of space in a storage drive and can reduce data storage density. As a result, storage drives frequently do not utilize such storage capacitors or alternatively utilize capacitors having very limited energy storage capacity. In contrast, in a storage drive employing selective flush command processing in accordance with the present description, high performance and low write latency may be facilitated, obviating or reducing use of storage capacitors in some applications.

It is further recognized herein that an application having a capability of organizing write requests into various streams, and issuing to the operating system (OS), flush commands on a per stream basis, can add significant complexity and performance overhead, particularly to the operating system. In contrast, in a storage drive employing selective flush command processing in accordance with the present description, such added OS complexity and performance penalties may be reduced or eliminated.

Thus, a storage drive employing selective flushing in accordance with the present description may have improved performance or reduced complexity as compared to prior storage drives. In addition, such a storage drive may have reduced cost and a higher storage density. However, it is appreciated that features and advantages of a system employing a storage drive having selective flush capability in accordance with an embodiment of the present disclosure may vary, depending upon the particular application.

Such devices in accordance with embodiments described herein can be used either in stand-alone memory circuits or logic arrays, or can be embedded in microprocessors and/or digital signal processors (DSPs). Additionally, it is noted that although systems and processes are described herein primarily with reference to microprocessor based systems in the illustrative examples, it will be appreciated that in view of the disclosure herein, certain aspects, architectures, and principles of the disclosure are equally applicable to other types of device memory and logic devices.

Implementations of the described techniques may include hardware, a method or process, or computer software on a computer-accessible medium. Thus, embodiments include corresponding computer systems, apparatus, and computer programs recorded on one or more computer storage devices, each configured to perform the actions of the methods.

Operations described herein are performed by logic which is configured to perform the operations either automatically or substantially automatically with little or no system operator intervention, except where indicated as being performed manually such as user selection. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom Very Large Scale Integrated (VLSI) circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several non-volatile memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Turning to the figures, FIG. 1 is a high-level block diagram illustrating selected aspects of a system implemented, according to an embodiment of the present disclosure. System 10 may represent any of a number of electronic and/or computing devices, that may include a memory device. Such electronic and/or computing devices may include computing devices such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, memory controller, memory, etc.). In alternative embodiments, system 10 may include more elements, fewer elements, and/or different elements. Moreover, although system 10 may be depicted as comprising separate elements, it will be appreciated that such elements may be integrated on to one platform, such as systems on a chip (SoCs). In the illustrative example, system 10 comprises a central processing unit or microprocessor 20, a memory controller 30, a memory 40, a storage drive 44 and peripheral components 50 which may include, for example, video controller, input device, output device, additional storage, network interface or adapter, battery, etc.

The microprocessor 20 includes a cache 25 that may be part of a memory hierarchy to store instructions and data, and the system memory may include both volatile memory as well as the memory 40 depicted which may include a non-volatile memory. The system memory may also be part of the memory hierarchy. Logic 27 of the microprocessor 20 may include one or more cores, for example.

Communication between the microprocessor 20 and the memory 40 may be facilitated by the memory controller (or chipset) 30, which may also facilitate in communicating with the storage drive 44 and the peripheral components 50. The system may include an offload data transfer engine for direct memory data transfers.

Storage drive 44 includes non-volatile storage and may be implemented as, for example, solid-state drives, magnetic disk drives, optical disk drives, storage area network (SAN), network access server (NAS), a tape drive, flash memory, persistent memory domains and other storage devices employing a volatile buffer memory and a nonvolatile storage memory. The storage may comprise an internal storage device or an attached or network accessible storage. The microprocessor 20 is configured to write data in and read data from the memory 40. Programs in the storage are loaded into the memory 40 and executed by the microprocessor 20. A network controller or adapter enables communication with a network, such as an Ethernet, a Fiber Channel Arbitrated Loop, etc. Further, the architecture may, in certain embodiments, include a video controller configured to render information on a display monitor, where the video controller may be embodied on a video card or integrated on integrated circuit components mounted on a motherboard or other substrate. An input device is used to provide user input to the microprocessor 20, and may include a keyboard, mouse, pen-stylus, microphone, touch sensitive display screen, input pins, sockets, or any other activation or input mechanism known in the art. An output device is capable of rendering information transmitted from the microprocessor 20, or other component, such as a display monitor, printer, storage, output pins, sockets, etc. The network adapter may be embodied on a network card, such as a peripheral component interconnect (PCI) card, PCI-express, or some other input/output (I/O) card, or on integrated circuit components mounted on a motherboard or other substrate.

One or more of the components of the device 10 may be omitted, depending upon the particular application. For example, a network router may lack a video controller, for example.

Any one or more of the devices of FIG. 1 including the cache 25, memory 40, system 10, memory controller 30 and peripheral components 50, may include a storage device employing selective volatile to nonvolatile flush in accordance with the present description, or be embodied as any type of data storage capable of storing data in a persistent manner (even if power is interrupted to non-volatile memory) such as but not limited to any particular type of memory devices. One example is a 3-dimensional (3D) crosspoint memory, and other types of byte-addressable, write-in-place non-volatile memory. In some embodiments, 3D crosspoint memory may comprise a transistor-less stackable cross point architecture in which memory cells sit at the intersection of word lines and bit lines and are individually addressable and in which bit storage is based on a change in bulk resistance.

In one embodiment, the memory device is a block addressable memory device, such as those based on NAND or NOR technologies. A memory device may also include future generation nonvolatile devices, such as a three dimensional crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

Such memory elements in accordance with embodiments described herein can be used either in stand-alone memory circuits or logic arrays, or can be embedded in microprocessors and/or digital signal processors (DSPs). Additionally, it is noted that although systems and processes are described herein primarily with reference to microprocessor based systems in the illustrative examples, it will be appreciated that in view of the disclosure herein, certain aspects, architectures, and principles of the disclosure are equally applicable to other types of device memory and logic devices.

Figure 2:
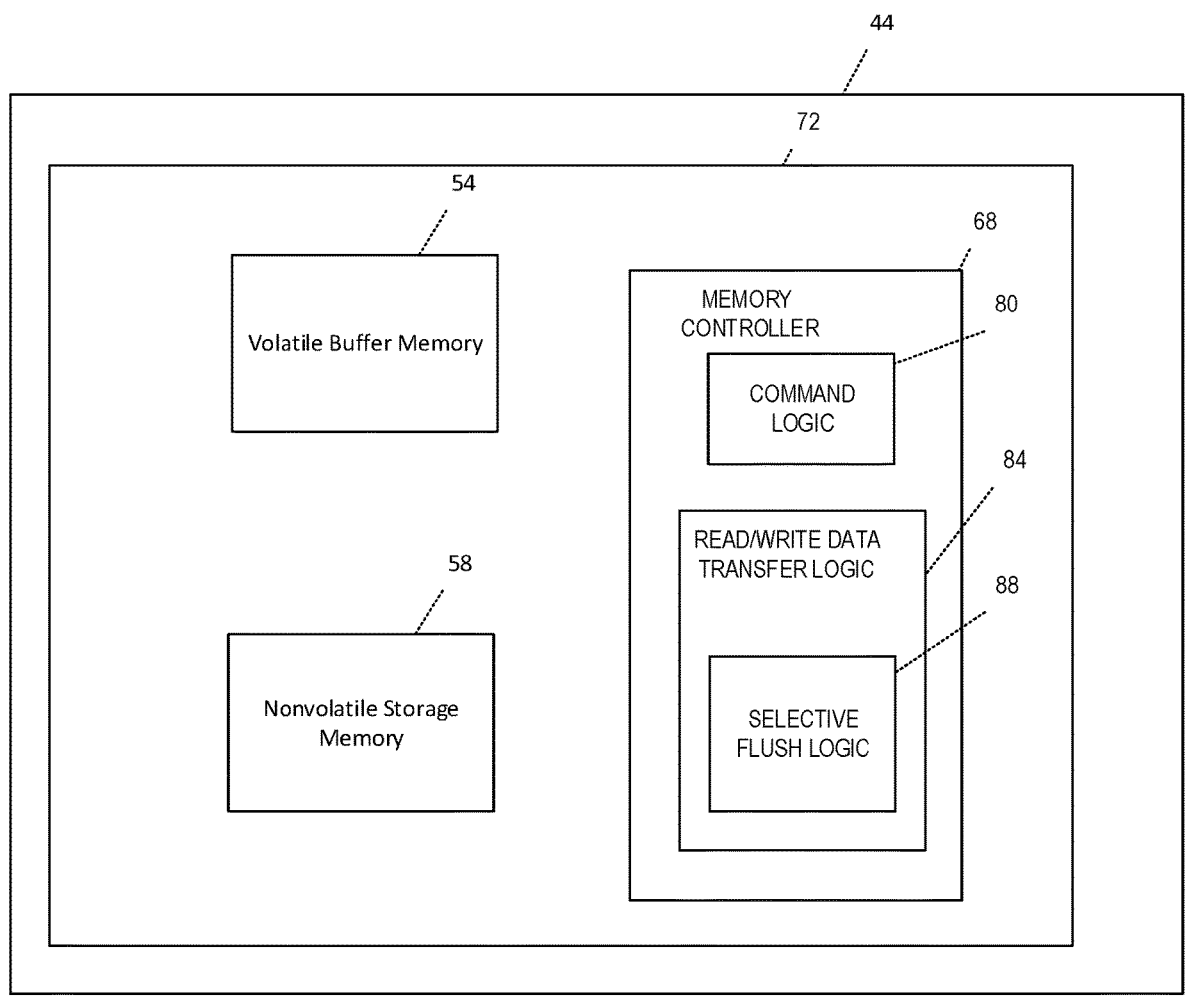
FIG. 2 depicts an example of a storage drive of FIG. 1 employing selective data flush in accordance with an embodiment of the present disclosure.

FIG. 2 shows a storage drive 44 which includes a volatile buffer memory 54 which temporarily stores write data prior to transfer of the write data to a nonvolatile storage memory 58. A memory controller 68 of the storage drive 44 manages the volatile buffer memory 54 and the nonvolatile storage memory 58. As explained in greater detail below, the memory controller 68 performs selective volatile to nonvolatile flush operations from the volatile buffer memory 54 to the nonvolatile storage memory 58. The storage drive 44 may include a housing 72 and in one embodiment, the volatile buffer memory 54, nonvolatile storage memory 58, and the memory controller 68 may each be disposed within the storage device housing 72. In alternative embodiments, one or more of the volatile buffer memory 54, nonvolatile storage memory 58, and the memory controller 68 may be disposed exterior to the storage device housing 72.

The memory controller 68 performs read operations to read data from a memory 54, 58 in response to a read command or read request and performs write requests to write data to a memory 54, 58 in response to a write command or write request. Depending upon the type of memory, the memory controller 68 may also perform one or more of refresh, formatting, wear leveling, garbage collection, address translation or mapping and other memory management operations. For example, the memory controller 68 may include a translation layer which maps host or file system logical block addresses (LBAs) to physical locations of a memory 54, 58. Such physical locations may be identified by various levels of identification (ID) including block ID's, page ID's and sector ID's, for example. The memory controller 68 may also flush write data from the volatile buffer memory 54 to the nonvolatile storage memory 58 when various conditions are met such as when the volatile buffer memory 54 is full, for example, or in anticipation of a system shut down, for example. In one aspect of the present description, the memory controller 68 may also selectively flush write data which has been identified for a selective flush from the volatile buffer memory 54 to the nonvolatile storage memory 58.

The volatile buffer memory 54 has a plurality of buffer locations configured to store data in a nonpersistent manner, that is, the data may be lost if power to the volatile buffer memory is lost. By comparison, the nonvolatile storage memory 58 has a plurality of storage locations configured to store data in a persistent manner, that is, the data remains stored in the nonvolatile storage memory 58 even if power to the memory 58 is lost. However, volatile buffer memory such as the memory 54 may have substantially higher performance characteristics as compared to the nonvolatile storage memory 58. For example, write requests to the volatile memory 54 may have a substantially lower write latency as compared to write requests directed to the nonvolatile storage memory 58.

The memory controller 68 is configured to perform input/output operations to selectively read data from and write data to the volatile buffer memory 54 and the nonvolatile storage memory 58 in response to read and write requests issued by a processor such as the microprocessor 20 (FIG. 1) or a data transfer engine such as a data memory access (DMA) controller. The memory controller 68 includes command logic 80 configured to receive various commands including read, write and memory management commands including a selective flush command as described in greater detail below.

Data transfer logic 84 of the memory controller 68 is configured to, in response to one or more write requests received by the command logic 80, execute the received write requests to store one or more sets of write data associated with the write requests in one or more sets of buffer locations of the volatile buffer memory 54 of the storage drive 44. Thus, write data is typically directed to the volatile buffer memory 54 instead of the nonvolatile storage memory 58 due to the higher performance characteristics of the volatile buffer memory 54.

In one aspect of the present description, the data transfer logic 84 includes selective flush logic 88 configured to, in response to a selective flush command received by the command logic 80, execute the selective flush command to selectively flush one or more sets of write data specified for selective flushing, from buffer locations of the volatile buffer memory 54 to appropriate storage locations of the nonvolatile storage memory 58 of the storage drive 44. Thus, the storage drive 44 may in one embodiment, process a selective-flush by ensuring that the dirty-writes in the transfer buffer which have been specified by a selective-flush process, are stored in nonvolatile storage memory, completing the writing of the data to the storage drive. A suitable write complete notification may be provided to the host or other source of the write data, indicating completion of the selective flush process.

In one embodiment, since only the write data identified for selective flushing is flushed in response to the selective flush command, the selective flush logic 88 is further configured to in contrast to a globally operating flush command, bypass flushing of write data stored in nonvolatile buffer which has not been identified for selective flushing. In this manner, the selective flush command when executed by the selective flush logic 88 of the data transfer logic 84, causes an identified set of write data to be flushed to and stored in the nonvolatile storage memory 58 while the sets of write data not specified for selective flushing remain stored in the volatile buffer memory 54 instead of being flushed to the nonvolatile storage memory 58.

In another aspect of the present description, write data stored in the volatile buffer memory 54 may be selected and identified for selective flushing to the nonvolatile storage memory 58 using a variety of techniques, depending upon the particular application. As described above, write data stored in the volatile buffer memory 54 may be selected and identified for selective flushing as a function of which host, application, thread, process or other command source issued the selective flush command. Thus, only the write data of the particular host, application, thread, process or other command source which issued the selective flush command, is flushed to nonvolatile storage memory as a result of the selective flush command.

Figure 3A:
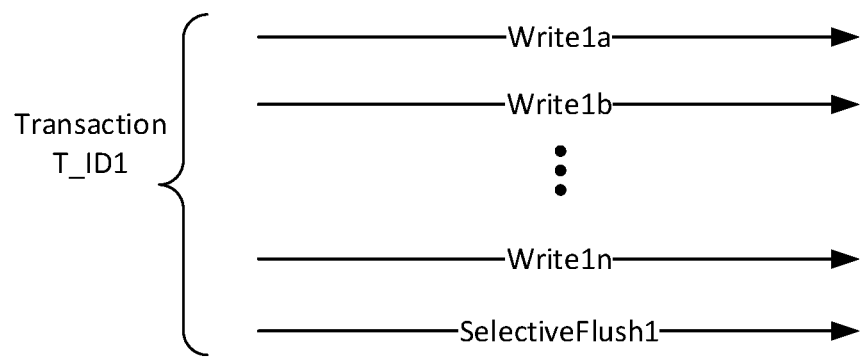
FIGS. 3A, 3B, 3C each show an example of a set of write requests directed to the storage drive of FIG. 2.

FIG. 3A depicts as another example, a write transaction which has been identified by a particular transaction identification, T_ID1, in this example. The transaction identification, T_ID1 is also referred to as a token or sequence identifier in some applications.

The write transaction T_ID1 comprises a defined set of write requests write1*a*, write1*b* . . . write1*n*. In one embodiment, each write request write1*a*, write1*b* . . . write1*n* of the set of write requests may include as a parameter, the write transaction identification, T_ID1, of which the write requests are a part.

In one embodiment, the defined set of write requests of the transaction may be limited to those originating from a particular host, application, thread, process, stream, queue or other write request source. In other embodiments, the stream of write requests may include those originating from multiple hosts, applications, threads, processes, streams, queues or other write request sources.

In one embodiment, a write transaction identification may be assigned to a write transaction by a storage device in response to a write transaction command. It is appreciated that a write transaction identification may be assigned to a write transaction using other techniques such as a host, application or operating system assigning a write transaction identification to a write transaction, depending upon the particular application.

Figure 4:
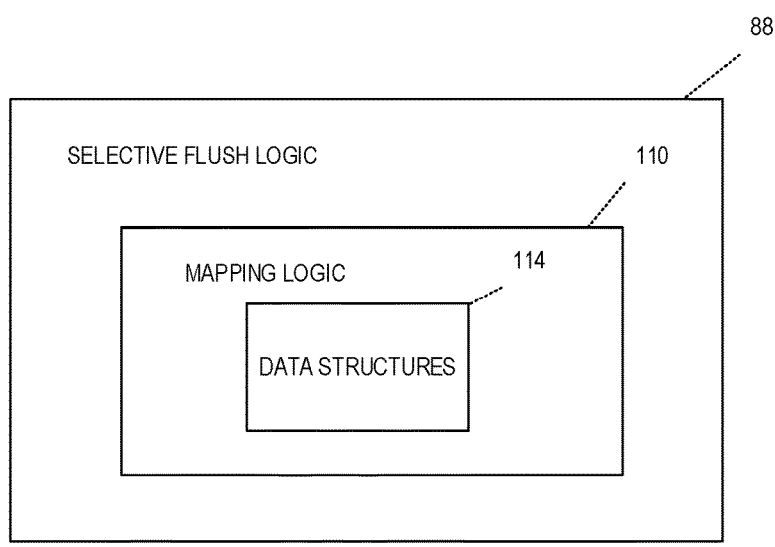
FIG. 4 depicts an example of selective flush logic in accordance with an embodiment of the present disclosure.

The set of write requests write1*a*, write1*b* . . . write1*n* cause a set of write data to be stored in a set of buffer locations of the volatile buffer memory 54 when the set of write requests write1*a*, write1*b* . . . write1*n* is received by the command logic 80 of the storage drive 44 and executed by the data transfer logic 84. The selective flush logic 88 may include mapping logic 110 (FIG. 4) configured to map the set of buffer locations storing the write data of the set of write requests write1*a*, write1*b* . . . write1*n* to the transaction ID (transaction identification T_ID1 in this example) of the write transaction of which the set of write requests write1*a*, write1*b* write1*n* is a part. Mappings of buffer locations of the volatile buffer memory 54 (FIG. 2) to transaction ID's may be stored in a suitable data structure such as one of the data structures 114 of the mapping logic 110 (FIG. 4).

FIG. 5A depicts an example of such a data structure in the form of a table 120 having a plurality of entries 124*a*, 124*b* . . . 124*n* in which each entry includes a pair of fields 120*a*, 120*b* which map a set of buffer locations storing the write data of the set of write requests of a particular write transaction, to an associated write transaction identification. In the example of FIG. 3A, the write requests write1*a*, write1*b* . . . write1*n* having transaction identification T_ID1 caused a set of write data to be stored in a set of buffer locations designated as BLS1, for example, as indicated in the buffer location field 120*a* of an entry 124*a* of the table 120. Thus, entry 124*a* maps the set of buffer locations BLS1 storing the write data of the write requests write1*a*, write1*b* write1*n* (FIG. 3A), to the transaction identification T_ID1 of the transaction ID field 120*b* of the entry 124*a*.

In one embodiment, the selective flush command identifies the set of write data to be flushed as a function of the write transaction identification associated with the write requests which caused the set of write data to be stored in the volatile buffer memory 54. The selective flush command may, in one embodiment be included as a part of the transaction at the end of the write requests write1*a*, write1*b* . . . write1*n*, and include as a parameter of the selective flush command, a transaction ID to which the selective flush command pertains. In the example of FIG. 3A, a selective flush command SelectiveFlush1 includes the write transaction identification T_ID1 as a parameter of the selective flush command SelectiveFlush1. In one embodiment, the write transaction identification parameter is used by the selective flush logic 88 which is configured to identify a particular set of write data to be flushed to the nonvolatile storage memory as a function of the write transaction identification.

The selective flush logic 88, in response to a selective flush command SelectiveFlush1 having the write transaction identification T_ID1 as a parameter of the selective flush command SelectiveFlush1, executes the selective flush command SelectiveFlush1 to selectively flush only the set of write data stored in the set of buffer locations BLS1 mapped by the entry 124*a* of the table 120 (FIG. 5A) to the transaction ID T_ID1, to appropriate storage locations of the nonvolatile storage memory 58 of the storage drive 44. The appropriate storage locations of the nonvolatile storage memory 58 are identified by the write requests write1*a*, write1*b* . . . write1*n* (FIG. 3A) of the write transaction T_ID1. In this manner, the selective flush command flushes only the write data of the write requests of the write transaction T_ID1.

Because the selective flush command is selective, write data stored in the volatile buffer memory 54 which is not identified by the selective flush command, is not flushed to the nonvolatile storage memory 58 as a function of the selective flush command, but instead remains stored in the volatile buffer memory 54 unless flushed due to other factors or flush criteria apart from the selective flush command itself. Accordingly, the selective flush logic 88 is configured to bypass flushing of write data which has not been identified for flushing in connection with a selective flush command. In the example of FIGS. 3A and 5A, the selective flush logic 88 bypasses flushing of write data which is not stored in the buffer locations BLS1 since data not stored in the buffer locations BLS1 has not been identified for flushing in connection with a selective flush command SelectiveFlush1. Thus, flushing of write data of other transactions, for example, which is stored in buffer locations other than buffer locations BLS1, is bypassed in the flushing operations associated with selective flush command SelectiveFlush1. Instead, the selective flush command SelectiveFlush1 flushes only the write data of the write requests of the write transaction T_ID1.

Figure 3B:
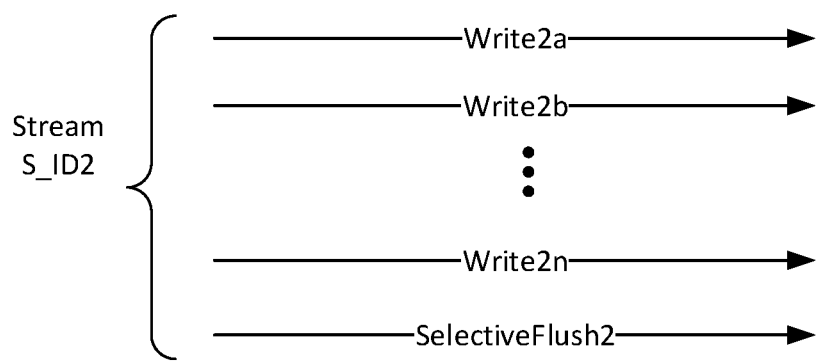

In another example, write data stored in the volatile buffer memory 54 may be selected and identified for selective flushing to the nonvolatile storage memory 58 using a stream identification, for example. FIG. 3B depicts, for example, a stream of write requests which has been identified by a particular stream identification, S_ID2, in this example. In one embodiment, the stream of write requests may be limited to those originating from a particular host, application, thread, process, transaction, queue or other write request source. In other embodiments, the stream of write requests may include those originating from multiple hosts, applications, threads, processes transactions, queues or other write request sources. The write stream S_ID2 comprises a set of write requests write2a, write2b . . . write2n.

Write requests in a write stream to a data storage device may be assigned a write stream identification using a variety of techniques, depending upon the particular application. For example, a storage device may have a defined number of physical or logical write stream input ports configured to receive different write streams. Each write stream input port may be assigned a write stream identification and each write request directed to a particular write stream input port may be assigned the write stream identification of that write stream input port. In one embodiment, each write request write2a, write2b . . . write2n of the set of write requests may include as a parameter, the stream identification, S_ID2, of which the write requests are a part. However, it is appreciated that in some embodiments, placement of a write request in a particular stream of write requests may provide sufficient identification of the stream of write requests to which the write request pertains.

The set of write requests write2a, write2b . . . write2n cause a set of write data to be stored in a set of buffer locations of the volatile buffer memory 54 when the set of write requests write2a, write2b . . . write2n is received by the command logic 80 and executed by the data transfer logic 84. FIG. 5B depicts an example of a data structure in the form of a table 130 having a plurality of entries 134a, 134b . . . 134n in which each entry includes a pair of fields 130a, 130b which map a set of buffer locations storing the write data of the set of write requests of a particular write stream, to an associated write stream identification. In the example of FIG. 3B, the write requests write2a, write2b . . . write2n caused a set of write data to be stored in a set of buffer locations designated as BLS2, for example, in the buffer location field 130a of an entry 134a of the table 130. Thus, entry 134a maps the set of buffer locations BLS2 storing the write data of the write requests write2a, write2b . . . write2n (FIG. 3B), to the stream identification S_ID2 of the stream ID field 130b of the entry 134a.

In one embodiment, the selective flush command identifies the set of write data to be flushed as a function of the write stream identification associated with the write requests which caused the set of write data to be stored in the volatile buffer memory 54. The selective flush command may, in one embodiment be included as a part of the stream at the end of the write requests for which flushing is to be requested. In one embodiment, the selective flush command may include as a parameter of the selective flush command, a stream ID to which the selective flush command pertains. In the example of FIG. 3B, a selective flush command SelectiveFlush2 may include the write stream identification S_ID2 as a parameter of the selective flush command. However, it is appreciated that in some embodiments, placement of a selective flush command in a particular stream of write requests may provide sufficient identification of the stream of write requests to which the selective flush command pertains.

In one embodiment, the selective flush logic 88 is configured to identify a particular set of write data to be flushed to the nonvolatile storage memory as a function an identification associated with the selective flush command. Thus, in the example of FIG. 3B, the selective flush logic 88, in response to a selective flush command SelectiveFlush2 positioned at the end of the write stream S_ID2 and/or having the write stream identification S_ID2 as a parameter of the selective flush command, executes the selective flush command SelectiveFlush2 to selectively flush only the set of write data stored in the set of buffer locations BLS2 mapped by the entry 134a of the table 130 (FIG. 5B) to the stream ID, S_ID2, to appropriate storage locations of the nonvolatile storage memory 58 of the storage drive 44. The appropriate storage locations of the nonvolatile storage memory 58 are identified by the write requests write2a, write2b . . . write2n (FIG. 3B) of the write stream S_ID2. In this manner, the selective flush command flushes only the write data of the write requests of the write stream S_ID2 which precede the selective flush command SelectiveFlush2 and have not yet been flushed to the nonvolatile storage memory.

Conversely, in the example of FIGS. 3B and 5B, the selective flush logic 88 bypasses flushing of write data which is not stored in the buffer locations BLS2 since data not stored in the buffer locations BLS2 has not been identified for flushing in connection with a selective flush command SelectiveFlush2. Thus, flushing of write data of other streams stored in buffer locations other than BLS2, is bypassed in the flushing operations associated with selective flush command SelectiveFlush2. Instead, the selective flush command SelectiveFlush2 flushes only the write data of the write requests of the write stream S_ID2 which precede the selective flush command SelectiveFlush2 and have not yet been flushed to the nonvolatile storage memory.

Figure 3C:
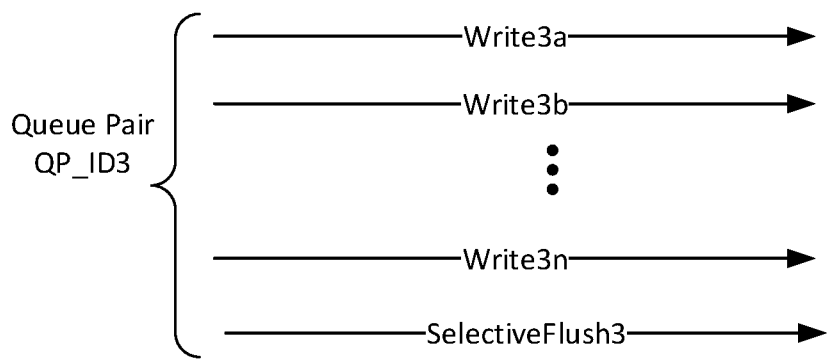

In another example, write data stored in the volatile buffer memory 54 may be selected and identified for selective flushing to the nonvolatile storage memory 58 as a function of a paired submission and completion queue identification, for example. FIG. 3C depicts an example of a set of write requests write3a, write3b . . . write3n placed in a submission queue of a submission and completion queue pair which has been identified by a paired submission and completion queue identification QP_ID3, in this example. Completions are placed into an associated completion queue by the memory controller 68. It is noted that multiple submission queues may utilize the same completion queue.

In one embodiment, the queue of write requests may be limited to those originating from a particular host, application, thread, process, transaction, stream or other write request source. In other embodiments, the queue of write requests may include those originating from multiple hosts, applications, threads, processes, transactions, streams or other write request sources.

Write requests in a submission and completion queue pair to a data storage device may be assigned a paired submission and completion queue identification using a variety of techniques, depending upon the particular application. For example, a storage device may have a defined number of physical or logical submission and completion queue pair input and output ports configured to process different submission and completion queue pairs. Each pair of ports for a submission and completion queue pair may be assigned a paired submission and completion queue identification and each write request directed to a particular submission input port of a submission and completion queue pair may be assigned the paired submission and completion queue identification of that submission input port. In one embodiment, each write request write3a, write3b . . . write3n of the submission and completion queue pair may include as a parameter, the paired submission and completion queue identification, QP_ID3. However, it is appreciated that in some embodiments, placement of a write request in a particular submission queue of a submission and completion queue pair may provide sufficient identification of the queue of write requests to which the write request pertains.

The set of write requests write3a, write3b . . . write3n cause a set of write data to be stored in a set of buffer locations of the volatile buffer memory 54 when the set of write requests write3a, write3b . . . write3n is received by the command logic 80 and executed by the data transfer logic 84. FIG. 5C depicts an example of a data structure in the form of a table 140 having a plurality of entries 144a, 144b . . . 144n in which each entry includes a pair of fields 140a, 140b which map a set of buffer locations storing the write data of the set of write requests of a particular submission and completion queue pair, to an associated paired submission and completion queue identification. In the example of FIG. 3C, the write requests write3a, write3b write3n caused a set of write data to be stored in a set of buffer locations designated as BLS3, for example, as indicated in the buffer location field 140a of an entry 144a of the table 140. Thus, entry 144a maps the set of buffer locations BLS3 storing the write data of the write requests write3a, write3b . . . write3n (FIG. 3C), to the paired submission and completion queue identification QP_ID3 of the queue pair ID field 140b of the entry 144a.

In one embodiment, the selective flush command identifies the set of write data to be flushed as a function of the paired submission and completion queue identification associated with the write requests which caused the set of write data to be stored in the volatile buffer memory 54. The selective flush command may include as a parameter of the selective flush command, a paired submission and completion queue identification to which the selective flush command pertains. In the example of FIG. 3C, a selective flush command SelectiveFlush3 may include the paired submission and completion queue identification QP_ID3 as a parameter of the selective flush command. However, it is appreciated that in some embodiments, placement of a selective flush command in a particular queue of write requests may provide sufficient identification of the queue of write requests to which the selective flush command pertains.

As noted above, in one embodiment, the selective flush logic 88 is configured to identify a particular set of write data to be flushed to the nonvolatile storage memory as a function of an identification associated with the selective flush command. Thus, in the example of FIG. 3C, the selective flush logic 88, in response to a selective flush command SelectiveFlush3 positioned at the end of the submission queue of the queue pair QP_ID3 and/or having the queue pair identification QP_ID3 as a parameter of the selective flush command, executes the selective flush command SelectiveFlush3 to selectively flush only the set of write data stored in the set of buffer locations BLS3 mapped by the entry 144a of the table 140 (FIG. 5C) to the queue pair ID, QP_ID3, to appropriate storage locations of the nonvolatile storage memory 58 of the storage drive 44. The appropriate storage locations of the nonvolatile storage memory 58 are identified by the write requests write3a, write3b . . . write3n (FIG. 3C) of the queue pair QP_ID3. In this manner, the selective flush command flushes only the write data of the write requests of the queue pair QP_ID3 which precede the selective flush command SelectiveFlush3 and have not yet been flushed to the nonvolatile storage memory.

Conversely, in the example of FIGS. 3C and 5C, the selective flush logic 88 bypasses flushing of write data which is not stored in the buffer locations BLS3 since data not stored in the buffer locations BLS3 has not been identified for flushing in connection with a selective flush command SelectiveFlush3. Thus, flushing of write data of other streams stored in buffer locations other than BLS3, is bypassed in the flushing operations associated with selective flush command SelectiveFlush3. Instead, the selective flush command SelectiveFlush3 flushes only the write data of the write requests of the queue pair QP_ID3 which precede the selective flush command SelectiveFlush3 and have not yet been flushed to the nonvolatile storage memory.

A similar data structure may be employed in connection with other sources of write data, to map buffer locations storing write data to an identification of the particular source of the write data. For example, a table may map buffer locations storing the dirty write data of a particular host, application, process, thread, or other write data source to an appropriate identification of the host, application, process, thread or other write data source. A selective flush command in accordance with the present description may cause the selective flushing of that write data identified as a function of the source identification, using the appropriate mapping table.

In one embodiment, selective flush commands may be dedicated commands in which the sole function of the selective flush command is to initiate the flushing of selected write data which has been identified for selective flushing in connection with the selective flush command. It is appreciated that in other embodiments, the functions of a selective flush command may be combined with other functions such that the selective flush portion of a command may be part of a hybrid command that causes other functions to be performed in addition to selective flushing operations. For example, a commit command which causes a storage drive to commit a set of write requests may also set a selective flush flag in the storage drive to cause the storage drive to initiate selective flush operations as described herein in addition to the commit operations of the hybrid command.

Figure 6:
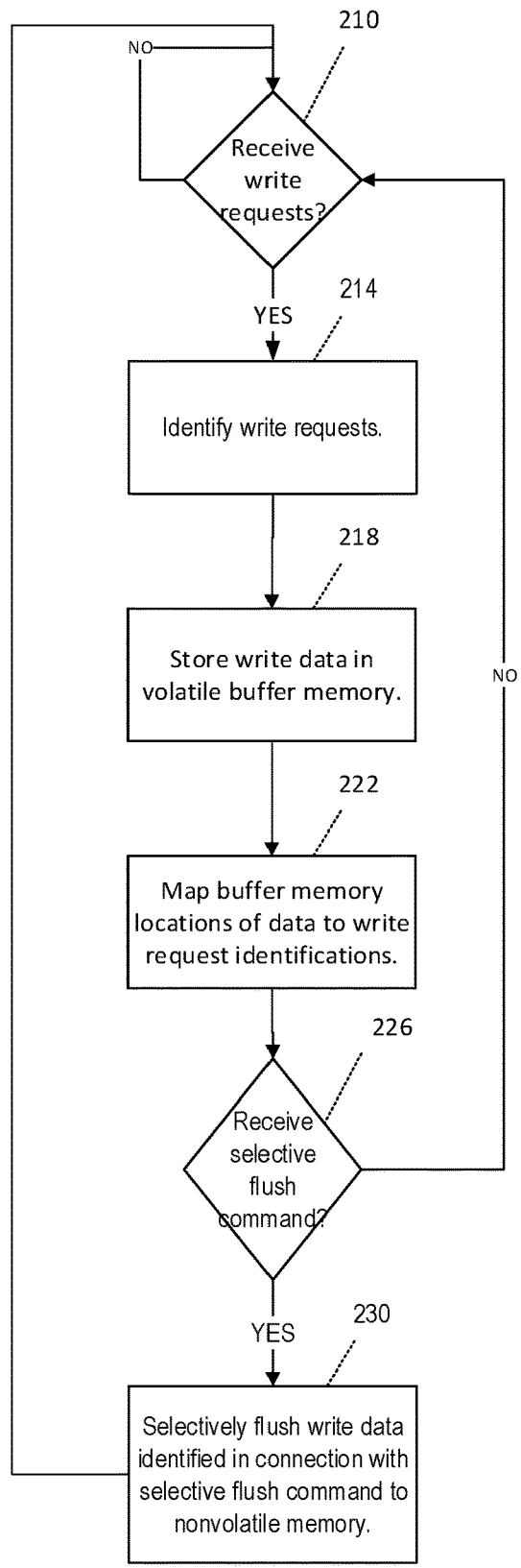
FIG. 6 depicts one example of the operations of the storage drive of FIG. 2.

FIG. 6 depicts one example of operations of the storage drive 44 employing selective flush to nonvolatile storage memory in accordance with the present description. In one operation, the storage drive 44 may receive (block 210) write requests to write data in the storage drive. FIGS. 3A, 3B, 3C discussed above depict examples of sets of write requests which may be received by a storage drive employing selective flush to nonvolatile storage memory in accordance with the present description. These sets of write requests include write requests of a write transaction (FIG. 3A), a stream of write requests (FIG. 3B) and write requests of a submission and completion queue pair (FIG. 3C). It is appreciated that other types sets of write requests may be received, depending upon the particular application.

In connection with the receipt of write requests, the received write requests are identified (block 214). As indicated in the examples of FIGS. 3A, 3B, 3C, the write requests of a write transaction may be identified by a transaction ID (FIG. 3A), the write requests of a stream of write requests may be identified by a stream ID, and the write requests of a submission and completion queue pair may be identified by a paired submission and completion queue ID. These write request identifications may be determined by the storage drive examining a write request parameter, or by identifying the particular transaction, stream or queue of which the write request is a part. Write request identifications may also be determined by examining the source of the write requests such as a particular host, application, thread, process etc. It is appreciated that write requests may be identified using other techniques, depending upon the particular application.

In response to the received write requests, the storage drive stores (block 218) the write data of the received write requests in buffer locations of the volatile buffer memory 54 (FIG. 2)_and maps (block 222) those buffer locations storing the write data to the write request identifications of the write requests which caused the write data to be stored in those particular buffer locations. FIGS. 5A, 5B, 5C provide examples of tables mapping buffer locations to a write transaction identification (FIG. 5A), buffer locations to a stream identification (FIG. 5B), and buffer locations to a paired submission and completion queue identification (FIG. 5C). It is appreciated that buffer locations storing write data may be mapped to write request identifications using other types of data structures, depending upon the particular application.

A determination (block 226) is made as to whether the storage drive has received a selective flush command. If so, the storage drive selectively flushes (block 230) the write data which has been identified in connection with the selective flush command, from buffer locations of the volatile buffer memory to the nonvolatile storage memory. In one embodiment, write data may be identified for selective flushing using the mapping (block 222) which mapped the identification associated with the selective flush command, to buffer locations storing the selected write data to be flushed.

It is seen from the above, that a system employing a storage drive having selective flush capability in accordance with an embodiment of the present disclosure may reduce write latency and improve system performance in a storage drive having both a volatile buffer memory and a nonvolatile storage memory. Other aspects and advantages may be realized, depending upon the particular application.

EXAMPLES

The following examples pertain to further embodiments.

Example 1 is an apparatus, comprising:

a storage device which includes a volatile buffer memory having a plurality of buffer locations configured to store data, and a nonvolatile storage memory having a plurality of storage locations configured to store data, and a controller which includes:

command logic configured to receive a plurality of commands including a first set of write requests, a second set of write requests, and a selective flush command to selectively flush data from the volatile buffer memory to the nonvolatile storage memory as a function of a data identification, and data transfer logic, configured to, in response to the first set of write requests received by the command logic, execute the first set of write requests to store a first set of write data associated with the first set of write requests in a first set of buffer locations of the volatile buffer memory of the storage device instead of the nonvolatile storage memory, and in response to the second set of write requests received by the command logic, execute the second set of write requests to store a second set of write data associated with the second set of write requests in a second set of buffer locations in the volatile buffer memory instead of the nonvolatile storage memory, wherein the data transfer logic includes selective flush logic configured to, in response to a selective flush command received by the command logic, execute the selective flush command to selectively flush the first set of write data from the first set of buffer locations of the volatile buffer memory to the nonvolatile storage memory of the storage device and bypass flushing of the second set of write data from the second set of buffer locations of the nonvolatile storage memory so that the selective flush command when executed by the data transfer logic, causes the first set of write data to be stored in the nonvolatile storage memory and the second set of write data to remain stored in the volatile buffer memory instead of the nonvolatile storage memory.

In Example 2, the subject matter of Examples 1-8 (excluding the present Example) can optionally include wherein the first set of write requests is included in a write transaction having a write transaction identification and wherein the selective flush command has a write transaction identification parameter to identify the first set of write data to be flushed to the nonvolatile storage memory as a function of the write transaction identification.

In Example 3, the subject matter of Examples 1-8 (excluding the present Example) can optionally include wherein the controller further includes mapping logic configured to map the first set of buffer locations storing the first set of write data to the write transaction identification wherein flushing the first set of write data from the volatile buffer memory to nonvolatile storage memory includes transferring the first set of write data stored in the first set of buffer locations mapped to the write transaction identification, to the nonvolatile storage memory.

In Example 4, the subject matter of Examples 1-8 (excluding the present Example) can optionally include wherein the first set of write requests and the selective flush command are included in a write stream of write requests having a write stream identification to identify the first set of write data to be flushed to the nonvolatile storage memory as a function of the write stream identification.

In Example 5, the subject matter of Examples 1-8 (excluding the present Example) can optionally include wherein the controller further includes mapping logic configured to map the first set of buffer locations storing the first set of write data to the write stream identification wherein flushing the first set of write data from the volatile buffer memory to nonvolatile storage memory includes transferring the first set of write data stored in the first set of buffer locations mapped to the write stream identification, to the nonvolatile storage memory.

In Example 6, the subject matter of Examples 1-8 (excluding the present Example) can optionally include wherein the first set of write requests and the selective flush command are included in a submission queue of a submission and completion queue pair having a paired submission and completion queue identification to identify the first set of write data to be flushed to the nonvolatile storage memory as a function of the paired submission and completion queue identification.

In Example 7, the subject matter of Examples 1-8 (excluding the present Example) can optionally include wherein the controller further includes mapping logic configured to map the first set of buffer locations to the paired submission and completion queue identification wherein flushing the first set of write data from the volatile buffer memory to nonvolatile storage memory includes transferring the first set of write data stored in the first set of buffer locations mapped to the paired submission and completion queue identification, to the nonvolatile storage memory.

In Example 8, the subject matter of Examples 1-8 (excluding the present Example) can optionally include a system, said system comprising:
a central processing unit,
said storage device,
said controller, and
at least one of a display communicatively coupled to the processor, a network interface communicatively coupled to the central processing unit, and a battery coupled to provide power to the system.

Example 9 is a method, comprising:
receiving by a controller of a storage device a first set of write requests and a second set of write requests,
in response to the write requests, storing a first set and a second set, respectively, of write data associated with the first set and the second set, respectively of write requests, in a first set and a second set, respectively, of buffer locations of a volatile buffer memory,
receiving by the controller a selective flush command to selectively flush the first set of write data to a nonvolatile storage memory as a function of an identification identifying the first set of write data, and
in response to the selective flush command, selectively flushing the first set of write data from the first set of buffer locations of the volatile buffer memory to nonvolatile storage memory and bypassing flushing of the second set of write data from the second set of buffer locations so that the first set of write data is stored in the nonvolatile storage memory and the second set of write data remains stored in the volatile buffer memory.

In Example 10, the subject matter of Examples 9-15 (excluding the present Example) can optionally include wherein the first set of write requests is included in a first write transaction having a write transaction identification and wherein the selective flush command identifies the first set of write data to be flushed as a function of a write transaction identification parameter of the selective flush command.

In Example 11, the subject matter of Examples 9-15 (excluding the present Example) can optionally include mapping the first set of buffer locations to the write transaction identification wherein flushing the first set of write data from the volatile buffer memory to nonvolatile storage memory includes transferring the first set of write data stored in the first set of buffer locations mapped to the write transaction identification, to the nonvolatile storage memory.

In Example 12, the subject matter of Examples 9-15 (excluding the present Example) can optionally include wherein the first set of write requests and the selective flush command are included in a write stream of write requests having a write stream identification to identify the first set of write data to be flushed as a function of the write stream identification.

In Example 13, the subject matter of Examples 9-15 (excluding the present Example) can optionally include mapping the first set of buffer locations to the write stream identification wherein flushing the first set of write data from the volatile buffer memory to nonvolatile storage memory includes transferring the first set of write data stored in the first set of buffer locations mapped to the write stream identification, to the nonvolatile storage memory.

In Example 14, the subject matter of Examples 9-15 (excluding the present Example) can optionally include wherein the first set of write requests and the selective flush command are included in a submission queue of a submission and completion queue pair having a paired submission and completion queue identification to identify the first set of write data to be flushed as a function of the a paired submission and completion queue identification.

In Example 15, the subject matter of Examples 9-15 (excluding the present Example) can optionally include mapping the first set of buffer locations to the paired submission and completion queue identification wherein flushing the first set of write data from the volatile buffer memory to nonvolatile storage memory includes transferring the first set of write data stored in the first set of buffer locations mapped to the paired submission and completion queue identification, to the nonvolatile storage memory.

Example 16 is an apparatus comprising means to perform a method as described in any preceding example.

Example 17 is a system, comprising:
a central processing unit,
a storage device which includes a volatile buffer memory having a plurality of buffer locations configured to store data, and a nonvolatile storage memory having a plurality of storage locations configured to store data, and
a controller which includes:
command logic configured to receive a plurality of commands including a first set of write requests, a second set of write requests, and a selective flush command to selectively flush data from the volatile buffer memory to the nonvolatile storage memory as a function of a data identification, and
data transfer logic, configured to, in response to the first set of write requests received by the command logic, execute the first set of write requests to store a first set of write data associated with the first set of write requests in a first set of buffer locations of the volatile buffer memory of the storage device instead of the nonvolatile storage memory, and in response to the second set of write requests received by the command logic, execute the second set of write requests to store a second set of write data associated with the second set of write requests in a second set of buffer locations in the volatile buffer memory instead of the nonvolatile storage memory, wherein the data transfer logic includes selective flush logic configured to, in response to a selective flush command received by the command logic, execute the selective flush command to selectively flush the first set of write data from the first set of buffer locations of the volatile buffer memory to the nonvolatile storage memory of the storage device and bypass flushing of the second set of write data from the second set of buffer locations of the nonvolatile storage memory so that the selective flush command when executed by the data transfer logic, causes the first set of write data to be stored in the nonvolatile storage memory and the second set of write data to remain stored in the volatile buffer memory instead of the nonvolatile storage memory.

In Example 18, the subject matter of Examples 17-24 (excluding the present Example) can optionally include wherein the first set of write requests is included in a write transaction having a write transaction identification and wherein the selective flush command has a write transaction identification parameter to identify the first set of write data to be flushed to the nonvolatile storage memory as a function of the write transaction identification.

In Example 19, the subject matter of Examples 17-24 (excluding the present Example) can optionally include wherein the controller further includes mapping logic configured to map the first set of buffer locations storing the first set of write data to the write transaction identification wherein flushing the first set of write data from the volatile buffer memory to nonvolatile storage memory includes transferring the first set of write data stored in the first set of buffer locations mapped to the write transaction identification, to the nonvolatile storage memory.

In Example 20, the subject matter of Examples 17-24 (excluding the present Example) can optionally include wherein the first set of write requests and the selective flush command are included in a write stream of write requests having a write stream identification to identify the first set of write data to be flushed to the nonvolatile storage memory as a function of the write stream identification.

In Example 21, the subject matter of Examples 17-24 (excluding the present Example) can optionally include wherein the controller further includes mapping logic configured to map the first set of buffer locations storing the first set of write data to the write stream identification wherein flushing the first set of write data from the volatile buffer memory to nonvolatile storage memory includes transferring the first set of write data stored in the first set of buffer locations mapped to the write stream identification, to the nonvolatile storage memory.

In Example 22, the subject matter of Examples 17-24 (excluding the present Example) can optionally include wherein the first set of write requests and the selective flush command are included in a submission queue of a submission and completion queue pair having a paired submission and completion queue identification to identify the first set of write data to be flushed to the nonvolatile storage memory as a function of the paired submission and completion queue identification.

In Example 23, the subject matter of Examples 17-24 (excluding the present Example) can optionally include wherein the controller further includes mapping logic configured to map the first set of buffer locations to the paired submission and completion queue identification wherein flushing the first set of write data from the volatile buffer memory to nonvolatile storage memory includes transferring the first set of write data stored in the first set of buffer locations mapped to the paired submission and completion queue identification, to the nonvolatile storage memory.

In Example 24, the subject matter of Examples 17-24 (excluding the present Example) can optionally include at least one of: a display communicatively coupled to the processor, a network interface communicatively coupled to the central processing unit, and a battery coupled to provide power to the system.

Example 25 is an apparatus, comprising:

a storage device which includes a volatile buffer memory having a plurality of buffer locations configured to store data, and a nonvolatile storage memory having a plurality of storage locations configured to store data, and a controller which includes:

command logic means for receiving a plurality of commands including a first set of write requests, a second set of write requests, and a selective flush command to selectively flush data from the volatile buffer memory to the nonvolatile storage memory as a function of a data identification, and data transfer logic means for, in response to the first set of write requests received by the command logic means, executing the first set of write requests to store a first set of write data associated with the first set of write requests in a first set of buffer locations of the volatile buffer memory of the storage device instead of the nonvolatile storage memory, and in response to the second set of write requests received by the command logic means, execute the second set of write requests to store a second set of write data associated with the second set of write requests in a second set of buffer locations in the volatile buffer memory instead of the nonvolatile storage memory, wherein the data transfer logic means includes selective flush logic means for, in response to a selective flush command received by the command logic means, executing the selective flush command to selectively flush the first set of write data from the first set of buffer locations of the volatile buffer memory to the nonvolatile storage memory of the storage device and bypass flushing of the second set of write data from the second set of buffer locations of the nonvolatile storage memory so that the selective flush command when executed by the data transfer logic means, causes the first set of write data to be stored in the nonvolatile storage memory and the second set of write data to remain stored in the volatile buffer memory instead of the nonvolatile storage memory.

In Example 26, the subject matter of Examples 25-32 (excluding the present Example) can optionally include wherein the first set of write requests is included in a write transaction having a write transaction identification and wherein the selective flush command has a write transaction identification parameter to identify the first set of write data to be flushed to the nonvolatile storage memory as a function of the write transaction identification.

In Example 27, the subject matter of Examples 25-32 (excluding the present Example) can optionally include wherein the controller further includes mapping logic means for mapping the first set of buffer locations storing the first set of write data to the write transaction identification wherein flushing the first set of write data from the volatile buffer memory to nonvolatile storage memory includes transferring the first set of write data stored in the first set of buffer locations mapped to the write transaction identification, to the nonvolatile storage memory.

In Example 28, the subject matter of Examples 25-32 (excluding the present Example) can optionally include wherein the first set of write requests and the selective flush command are included in a write stream of write requests having a write stream identification to identify the first set of write data to be flushed to the nonvolatile storage memory as a function of the write stream identification.

In Example 29, the subject matter of Examples 25-32 (excluding the present Example) can optionally include wherein the controller further includes mapping logic means for mapping the first set of buffer locations storing the first set of write data to the write stream identification wherein flushing the first set of write data from the volatile buffer memory to nonvolatile storage memory includes transferring the first set of write data stored in the first set of buffer locations mapped to the write stream identification, to the nonvolatile storage memory.

In Example 30, the subject matter of Examples 25-32 (excluding the present Example) can optionally include wherein the first set of write requests and the selective flush command are included in a submission queue of a submission and completion queue pair having a paired submission and completion queue identification to identify the first set of write data to be flushed to the nonvolatile storage memory as a function of the paired submission and completion queue identification.

In Example 31, the subject matter of Examples 25-32 (excluding the present Example) can optionally include wherein the controller further includes mapping logic means for mapping the first set of buffer locations to the paired submission and completion queue identification wherein flushing the first set of write data from the volatile buffer memory to nonvolatile storage memory includes transferring the first set of write data stored in the first set of buffer locations mapped to the paired submission and completion queue identification, to the nonvolatile storage memory.

In Example 32, the subject matter of Examples 25-32 (excluding the present Example) can optionally include a system, said system comprising:
a central processing unit,
said storage device,
said controller, and
at least one of a display communicatively coupled to the processor, a network interface communicatively coupled to the central processing unit, and a battery coupled to provide power to the system.

Example 33 is a computer program product for a computing system wherein the computer program product comprises a computer readable storage medium having program instructions embodied therewith, the program instructions executable by a processor of the computing system to cause operations, the operations comprising:
receiving by a controller of a storage device a first set of write requests and a second set of write requests,
in response to the write requests, storing a first set and a second set, respectively, of write data associated with the first set and the second set, respectively of write requests, in a first set and a second set, respectively, of buffer locations of a volatile buffer memory,
receiving by the controller a selective flush command to selectively flush the first set of write data to a nonvolatile storage memory as a function of an identification identifying the first set of write data, and
in response to the selective flush command, selectively flushing the first set of write data from the first set of buffer locations of the volatile buffer memory to nonvolatile storage memory and bypassing flushing of the second set of write data from the second set of buffer locations so that the first set of write data is stored in the nonvolatile storage memory and the second set of write data remains stored in the volatile buffer memory.

In Example 34, the subject matter of Examples 33-38 (excluding the present Example) can optionally include wherein the first set of write requests is included in a first write transaction having a write transaction identification and wherein the selective flush command identifies the first set of write data to be flushed as a function of a write transaction identification parameter of the selective flush command.

In Example 35, the subject matter of Examples 33-38 (excluding the present Example) can optionally include wherein the operations further comprise mapping the first set of buffer locations to the write transaction identification wherein flushing the first set of write data from the volatile buffer memory to nonvolatile storage memory includes transferring the first set of write data stored in the first set of buffer locations mapped to the write transaction identification, to the nonvolatile storage memory.

In Example 36, the subject matter of Examples 33-38 (excluding the present Example) can optionally include wherein the first set of write requests and the selective flush command are included in a write stream of write requests having a write stream identification to identify the first set of write data to be flushed as a function of the write stream identification.

In Example 37, the subject matter of Examples 33-38 (excluding the present Example) can optionally include wherein the operations further comprise mapping the first set of buffer locations to the write stream identification wherein flushing the first set of write data from the volatile buffer memory to nonvolatile storage memory includes transferring the first set of write data stored in the first set of buffer locations mapped to the write stream identification, to the nonvolatile storage memory.

In Example 38, the subject matter of Examples 33-38 (excluding the present Example) can optionally include wherein the first set of write requests and the selective flush command are included in a submission queue of a submission and completion queue pair having a paired submission and completion queue identification to identify the first set of write data to be flushed as a function of the a paired submission and completion queue identification, the operations further comprising mapping the first set of buffer locations to the paired submission and completion queue identification wherein flushing the first set of write data from the volatile buffer memory to nonvolatile storage memory includes transferring the first set of write data stored in the first set of buffer locations mapped to the paired submission and completion queue identification, to the nonvolatile storage memory.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching.

What is claimed is:

1. An apparatus, comprising:
   a storage device which includes a volatile buffer memory having a plurality of buffer locations configured to store data, and a nonvolatile storage memory having a plurality of storage locations configured to store data; and
   a controller which includes:
      command logic configured to receive a plurality of commands including a first set of write requests wherein the first set of write requests has an associated identification identifying the first set of write requests, a second set of write requests, and a selective flush command to selectively transfer data from the volatile buffer memory to the nonvolatile storage memory as a function of the associated identification identifying the first set of write requests; and
      data transfer logic, configured to, in response to the first set of write requests received by the command logic, execute the first set of write requests to store a first set of write data associated with the first set of write requests in a first set of buffer locations of the volatile buffer memory of the storage device instead of the nonvolatile storage memory, and in response to the second set of write requests received by the command logic, execute the second set of write requests to store a second set of write data associated with the second set of write requests in a second set of buffer locations in the volatile buffer memory instead of the nonvolatile storage memory, wherein the data transfer logic includes selective flush logic configured to, in response to a selective flush command received by the command logic, execute the selective flush command to selectively transfer the first set of write data from the first set of buffer locations of the volatile buffer memory to the nonvolatile storage memory of the storage device to store the selectively transferred first set of write data in the nonvolatile storage memory and bypass transferring of the second set of write data from the second set of buffer locations of the nonvolatile storage memory so that the selective flush command when executed by the data transfer logic, causes the transferred first set of write data to be stored in the nonvolatile storage memory and the second set of write data to remain stored in the volatile buffer memory instead of the nonvolatile storage memory.

2. The apparatus of claim 1 wherein the first set of write requests is included in a write transaction having the associated identification in the form of an associated write transaction identification identifying the first set of write requests of the first write transaction and wherein the selective flush command has a write transaction identification parameter to identify the first set of write data to be transferred to the nonvolatile storage memory as a function of the write transaction identification.

3. The apparatus of claim 2 wherein the controller further includes mapping logic configured to map the first set of buffer locations storing the first set of write data to the write transaction identification wherein transferring the first set of write data from the volatile buffer memory to nonvolatile storage memory includes transferring the first set of write data stored in the first set of buffer locations mapped to the write transaction identification, to the nonvolatile storage memory.

4. The apparatus of claim 1 wherein the first set of write requests and the selective flush command are included in a write stream of write requests having a write stream identification to identify the first set of write data to be transferred to the nonvolatile storage memory as a function of the write stream identification.

5. The apparatus of claim 4 wherein the controller further includes mapping logic configured to map the first set of buffer locations storing the first set of write data to the write stream identification wherein transferring the first set of write data from the volatile buffer memory to nonvolatile storage memory includes transferring the first set of write data stored in the first set of buffer locations mapped to the write stream identification, to the nonvolatile storage memory.

6. The apparatus of claim 1 wherein the first set of write requests and the selective flush command are included in a submission queue of a submission and completion queue pair having a paired submission and completion queue identification to identify the first set of write data to be transferred to the nonvolatile storage memory as a function of the paired submission and completion queue identification.

7. The apparatus of claim 6 wherein the controller further includes mapping logic configured to map the first set of buffer locations to the paired submission and completion queue identification wherein transferring the first set of write data from the volatile buffer memory to nonvolatile storage memory includes transferring the first set of write data stored in the first set of buffer locations mapped to the paired submission and completion queue identification, to the nonvolatile storage memory.

8. A method, comprising:
   receiving by a controller of a storage device a first set of write requests and a second set of write requests;
   in response to the write requests, storing a first set and a second set, respectively, of write data associated with the first set and the second set, respectively of write requests, in a first set and a second set, respectively, of buffer locations of a volatile buffer memory wherein the first set of write requests has an associated identification identifying the first set of write requests;

receiving by the controller a selective flush command to selectively transfer the first set of write data to a nonvolatile storage memory as a function of the associated identification identifying the first set of write requests to store the selectively transferred first set of write data in the nonvolatile storage memory; and in response to the selective flush command, selectively transferring the first set of write data from the first set of buffer locations of the volatile buffer memory to nonvolatile storage memory and bypassing transferring of the second set of write data from the second set of buffer locations so that the transferred first set of write data is stored in the nonvolatile storage memory and the second set of write data remains stored in the volatile buffer memory.

9. The method of claim 8 wherein the first set of write requests is included in a first write transaction having the associated identification in the form of an associated write transaction identification identifying the first set of write requests of the first write transaction and wherein the selective flush command identifies the first set of write data to be transferred as a function of a write transaction identification parameter of the selective flush command.

10. The method of claim 9 further comprising mapping the first set of buffer locations to the write transaction identification wherein transferring the first set of write data from the volatile buffer memory to nonvolatile storage memory includes transferring the first set of write data stored in the first set of buffer locations mapped to the write transaction identification, to the nonvolatile storage memory.

11. The method of claim 8 wherein the first set of write requests and the selective flush command are included in a write stream of write requests having the associated identification in the form of an associated write stream identification to identify the first set of write data to be transferred as a function of the write stream identification.

12. The method of claim 11 further comprising mapping the first set of buffer locations to the write stream identification wherein transferring the first set of write data from the volatile buffer memory to nonvolatile storage memory includes transferring the first set of write data stored in the first set of buffer locations mapped to the write stream identification, to the nonvolatile storage memory.

13. The method of claim 8 wherein the first set of write requests and the selective flush command are included in a submission queue of a submission and completion queue pair having the associated identification in the form of an associated paired submission and completion queue identification to identify the first set of write data to be transferred as a function of the paired submission and completion queue identification.

14. The method of claim 13 further comprising mapping the first set of buffer locations to the paired submission and completion queue identification wherein transferring the first set of write data from the volatile buffer memory to nonvolatile storage memory includes transferring the first set of write data stored in the first set of buffer locations mapped to the paired submission and completion queue identification, to the nonvolatile storage memory.

15. A system, comprising:
a central processing unit;
a storage device which includes a volatile buffer memory having a plurality of buffer locations configured to store data, and a nonvolatile storage memory having a plurality of storage locations configured to store data; and
a controller which includes:
command logic configured to receive a plurality of commands including a first set of write requests wherein the first set of write requests has an associated identification identifying the first set of write requests, a second set of write requests, and a selective flush command to selectively transfer data from the volatile buffer memory to the nonvolatile storage memory as a function of the associated identification identifying the first set of write requests; and
data transfer logic, configured to, in response to the first set of write requests received by the command logic, execute the first set of write requests to store a first set of write data associated with the first set of write requests in a first set of buffer locations of the volatile buffer memory of the storage device instead of the nonvolatile storage memory, and in response to the second set of write requests received by the command logic, execute the second set of write requests to store a second set of write data associated with the second set of write requests in a second set of buffer locations in the volatile buffer memory instead of the nonvolatile storage memory, wherein the data transfer logic includes selective flush logic configured to, in response to a selective flush command received by the command logic, execute the selective flush command to selectively transfer the first set of write data from the first set of buffer locations of the volatile buffer memory to the nonvolatile storage memory of the storage device to store the selectively transferred first set of write data in the nonvolatile storage memory and bypass transferring of the second set of write data from the second set of buffer locations of the nonvolatile storage memory so that the selective flush command when executed by the data transfer logic, causes the transferred first set of write data to be stored in the nonvolatile storage memory and the second set of write data to remain stored in the volatile buffer memory instead of the nonvolatile storage memory.

16. The system of claim 15 wherein the first set of write requests is included in a write transaction having the associated identification in the form of an associated write transaction identification identifying the first set of write requests of the first write transaction and wherein the selective flush command has a write transaction identification parameter to identify the first set of write data to be transferred to the nonvolatile storage memory as a function of the write transaction identification.

17. The system of claim 16 wherein the controller further includes mapping logic configured to map the first set of buffer locations storing the first set of write data to the write transaction identification wherein transferring the first set of write data from the volatile buffer memory to nonvolatile storage memory includes transferring the first set of write data stored in the first set of buffer locations mapped to the write transaction identification, to the nonvolatile storage memory.

18. The system of claim 15 wherein the first set of write requests and the selective flush command are included in a write stream of write requests having a write stream identification to identify the first set of write data to be transferred to the nonvolatile storage memory as a function of the write stream identification.

19. The system of claim 18 wherein the controller further includes mapping logic configured to map the first set of buffer locations storing the first set of write data to the write stream identification wherein transferring the first set of write data from the volatile buffer memory to nonvolatile storage memory includes transferring the first set of write data stored in the first set of buffer locations mapped to the write stream identification, to the nonvolatile storage memory.

20. The system of claim 15 wherein the first set of write requests and the selective flush command are included in a submission queue of a submission and completion queue pair having a paired submission and completion queue identification to identify the first set of write data to be transferred to the nonvolatile storage memory as a function of the paired submission and completion queue identification.

21. The system of claim 20 wherein the controller further includes mapping logic configured to map the first set of buffer locations to the paired submission and completion queue identification wherein transferring the first set of write data from the volatile buffer memory to nonvolatile storage memory includes transferring the first set of write data stored in the first set of buffer locations mapped to the paired submission and completion queue identification, to the nonvolatile storage memory.

22. The system of claim 15 further comprising at least one of: a display communicatively coupled to the central processing unit a network interface communicatively coupled to the central processing unit, and a battery coupled to provide power to the system.

* * * * *